(12) United States Patent
Kojima et al.

(10) Patent No.: US 7,050,241 B2
(45) Date of Patent: May 23, 2006

(54) IMAGE-TAKING LENS APPARATUS

(75) Inventors: Kaori Kojima, Kobe (JP); Kazuhiko Ishimaru, Kaizuka (JP)

(73) Assignee: Konica Minolta Opto, Inc., Hachioji (JP)

( * ) Notice: Subject to any disclaimer, the term of this patent is extended or adjusted under 35 U.S.C. 154(b) by 44 days.

(21) Appl. No.: 10/799,110

(22) Filed: Mar. 12, 2004

(65) Prior Publication Data

US 2005/0141100 A1    Jun. 30, 2005

(30) Foreign Application Priority Data

Dec. 24, 2003    (JP)    ............................. 2003-427264

(51) Int. Cl.
*G02B 15/14*    (2006.01)
(52) U.S. Cl. ...................... 359/689; 359/683
(58) Field of Classification Search ................ 359/683, 359/689
See application file for complete search history.

(56) References Cited

U.S. PATENT DOCUMENTS

| | | | | |
|---|---|---|---|---|
| 5,289,317 A | * | 2/1994 | Ikemori et al. | 359/689 |
| 6,078,434 A | | 6/2000 | Ori | 359/691 |
| 2003/0160902 A1 | | 8/2003 | Mihara et al. | 348/676 |

FOREIGN PATENT DOCUMENTS

| JP | 2003-057547 A | 2/2003 |
|---|---|---|
| JP | 2003-131129 A | 5/2003 |

* cited by examiner

*Primary Examiner*—Scott J. Sugarman
(74) *Attorney, Agent, or Firm*—Sidley Austin LLP

(57) ABSTRACT

A zoom lens system for forming an optical image of a subject on the light-receiving surface of an image sensor that converts the optical image into an electrical signal is provided with, from the object side thereof, at least a first lens unit, a second lens unit, and a third lens unit, and achieves zooming by varying the distances between the lens units. The first lens unit has a negative optical power. The second lens unit has a positive optical power. A prescribed condition is fulfilled.

19 Claims, 9 Drawing Sheets

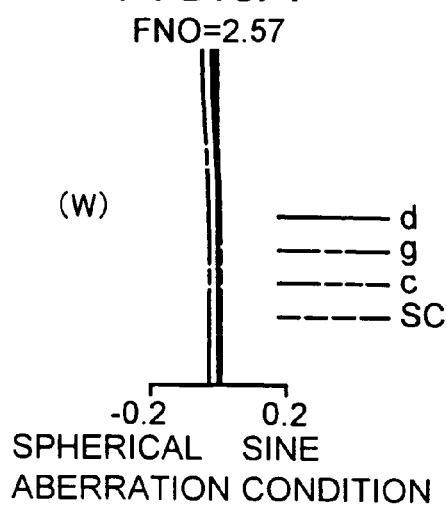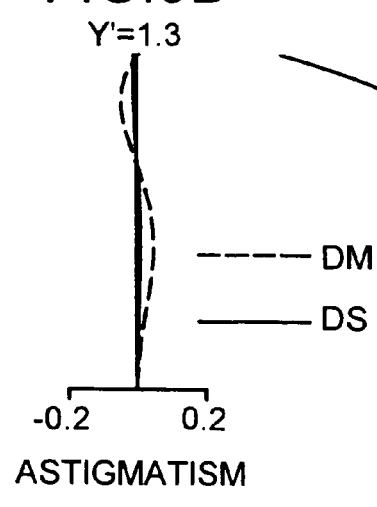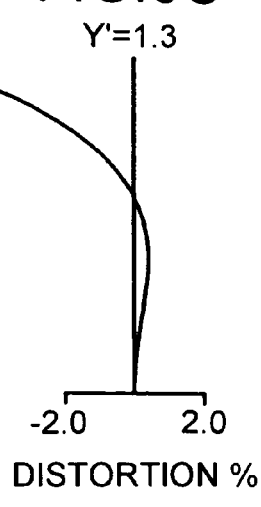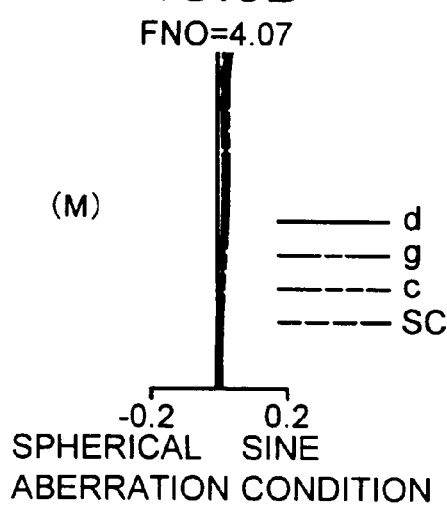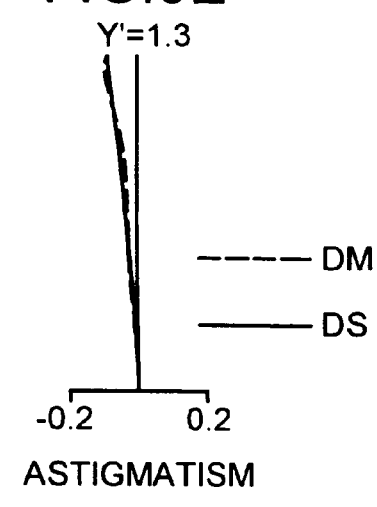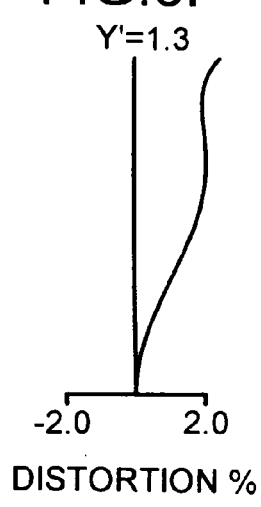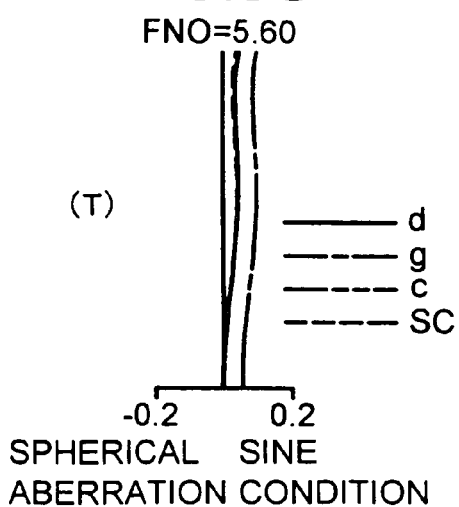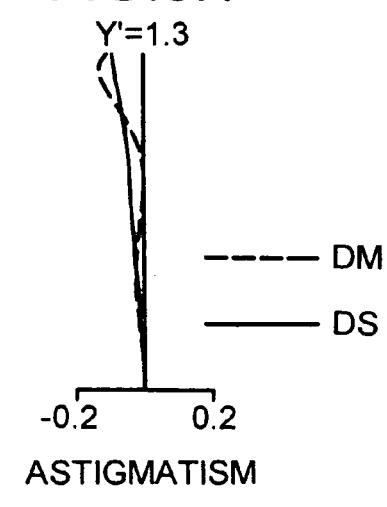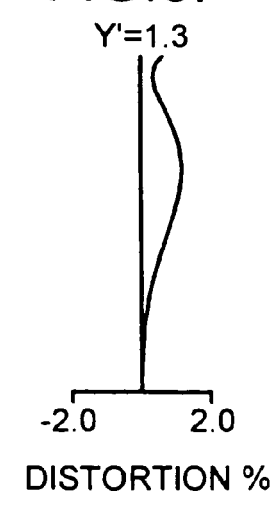

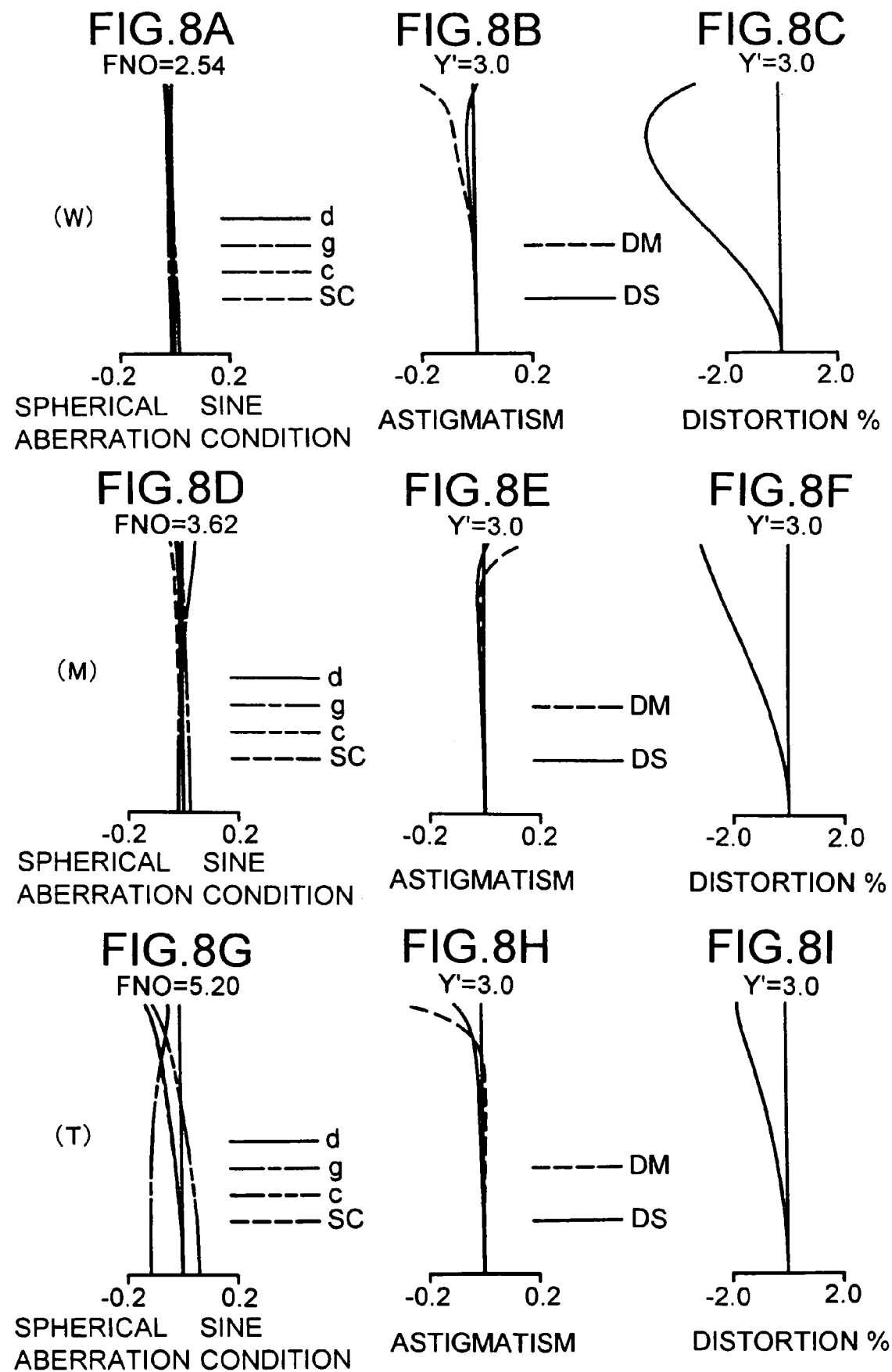

IMAGE-TAKING LENS APPARATUS

This application is based on Japanese Patent Application No. 2003-427264 filed on Dec. 24, 2003, the contents of which are hereby incorporated by reference.

BACKGROUND OF THE INVENTION

1. Field of the Invention

The present invention relates to an image-taking lens apparatus and to a zoom lens system. More particularly, the present invention relates to an image-taking lens apparatus that optically takes in an image of a subject through a zoom lens system and then outputs it in the form of an electrical signal by means of an image sensor, and among others to a compact zoom lens system and to an image-taking lens apparatus provided with such a zoom lens system.

2. Description of the Prior Art

Recent years have seen increasing popularity of compact and portable data equipment terminals, such as cellular phones and personal digital assistants, that are furnished with a compact image-taking lens apparatus so as to be capable of inputting images. On the other hand, in devices (such as Web cameras) for inputting digital images, compact image-taking lens apparatuses are sought after. The image-taking lens apparatuses incorporated in such devices typically have, for reasons of data transfer speed, smaller numbers of pixels as compared with those designed for use in digital still cameras or the like that handle images with 4-million-pixels or higher resolution, which are quite common nowadays. As a result, when the magnification of an image is varied for trimming or the like, i.e., when an image is subjected to so-called electronic zooming, the image comes to have considerably poor quality. Thus, such image-taking lens apparatuses will benefit greatly from being provided with an optical zooming function, which does not degrade the quality of an image even when its magnification is varied. Inconveniently, however, incorporating an image-taking lens apparatus with an optical zooming capability in a compact device requires the image-taking lens apparatus to be miniaturized.

A compact image-taking lens apparatus is proposed, for example, in U.S. Publication No. 2003/0160902 A1. This publication discloses a zoom lens system that is so constructed as to include at least a first lens unit having a negative optical power and a second lens unit having a positive optical power (hereinafter a zoom lens system of this type will be referred to as a "negative-led zoom lens system").

More specifically, the zoom lens system disclosed in the publication mentioned above includes a reflective optical element for bending the optical path. In this zoom lens system, bending the optical path helps make a camera slim, but additional inclusion of a thick optical low-pass filter and other extra components results in a comparatively long back focal length, hampering miniaturization of the entire system in terms of its length. Disposing an optical low-pass filter in the back focus region in this way makes it difficult to drastically shorten the back focal length. Moreover, shortening the back focal length causes the exit pupil to be located close to the image plane. As a result, off-axial rays exiting from the zoom lens system are obliquely incident on the image plane. This makes it impossible to fully exploit the light-condensing ability of the microlenses provided in front of a solid-state image sensor, resulting in extremely different brightness between in a central and a peripheral part of the image. This problem can be overcome by locating the exit pupil of the image-taking lens system away from the image plane, but doing so inevitably makes the zoom lens system as a whole unduly large.

SUMMARY OF THE INVENTION

An object of the present invention is to provide an image-taking lens apparatus that is made compact as a result of shortening the back focal length of the zoom lens system incorporated therein while maintaining high performance ensuring high image quality, and to provide a zoom lens system for use as the main component in such an image-taking lens apparatus.

To achieve the above object, according to one aspect of the present invention, a zoom lens system for forming an optical image of a subject on the light-receiving surface of an image sensor that converts the optical image into an electrical signal is constructed as follows: the zoom lens system is provided with, from the object side thereof, at least a first lens unit, a second lens unit, and a third lens unit; the zoom lens system achieves zooming by varying the distances between the lens units; the first lens unit has a negative optical power; and the second lens unit has a positive optical power. Moreover, the zoom lens system fulfills the following conditional formula:

$$0.1 < Bf/Y' < 1.0$$

where

Bf represents the axial distance from the last lens surface to the image plane (in a case where the last lens element is movable during zooming, the minimum axial distance from the last lens surface to the image plane throughout the zoom range); and Y' represents half the diagonal length of the image-sensing area.

According to another aspect of the present invention, a zoom lens system for forming an optical image of a subject on the light-receiving surface of an image sensor that converts the optical image into an electrical signal is constructed as follows: the zoom lens system is provided with, from the object side thereof, at least a first lens unit, a second lens unit, and a third lens unit; the zoom lens system achieves zooming by varying the distances between the lens units; the first lens unit has a negative optical power; and the second lens unit has a positive optical power. Moreover, the zoom lens system fulfills the following conditional formula:

$$0.1 < Bf/fw < 0.8$$

where

Bf represents the axial distance from the last lens surface to the image plane (in a case where the last lens element is movable during zooming, the minimum axial distance from the last lens surface to the image plane throughout the zoom range); and fw represents the focal length of the zoom lens system as a whole at the wide-angle end.

According to another aspect of the present invention, a zoom lens system for forming an optical image of a subject on the light-receiving surface of an image sensor that converts the optical image into an electrical signal is constructed as follows: the zoom lens system is provided with three lens units, namely, from the object side thereof, a first lens unit having a negative optical power, a second lens unit having a positive optical power, and a third lens unit having a positive optical power; and the zoom lens system achieves zooming by varying the distances between the lens units. Moreover, the zoom lens system fulfills the following conditional formula:

$$0.2 < P23/Pw < 1.0$$

where
- P23 represents the composite optical power of the second and third lens units; and
- Pw represents the optical power of the zoom lens system as a whole at the wide-angle end.

According to another aspect of the present invention, a zoom lens system for forming an optical image of a subject on the light-receiving surface of an image sensor that converts the optical image into an electrical signal is constructed as follows: the zoom lens system comprises, from the object side thereof, at least a first lens unit, a second lens unit, and a third lens unit; the zoom lens system achieves zooming by varying the distances between the lens units; the first lens unit has a negative optical power; and the second lens unit has a positive optical power. Moreover, the zoom lens system fulfills the following conditional formula:

$$0.01 < Bf/Lw < 0.2$$

where
- Bf represents the axial distance from the last lens surface to the image plane (in a case where the last lens element is movable during zooming, the minimum axial distance from the last lens surface to the image plane throughout the zoom range); and
- Lw represents the length from the most object-side surface of the zoom lens system to the image plane at the wide-angle end.

According to a further aspect of the present invention, an image-taking apparatus is provided with: one of the zoom lens systems constructed as described above; and the image sensor.

Any of the constructions described above permits the back focal length to be set appropriately, and thus makes it possible to realize an image-taking lens apparatus, and a zoom lens system for use in it, that is made satisfactorily compact while maintaining high performance ensuring high image quality throughout the zoom range. By incorporating an image-taking lens apparatus according to the present invention in a device such as a digital camera or personal digital assistant, it is possible to make the device slim, lightweight, compact, inexpensive, high-performance, intelligent, and otherwise better.

BRIEF DESCRIPTION OF THE DRAWINGS

This and other objects and features of the present invention will become clear from the following description, taken in conjunction with the preferred embodiments with reference to the accompanying drawings in which:

FIGS. 6A to 6I are aberration diagrams of Example 1;
FIGS. 8A to 8I are aberration diagrams of Example 3.

DESCRIPTION OF THE PREFERRED EMBODIMENTS

Hereinafter, image-taking lens apparatuses and zoom lens systems embodying the present invention will be described with reference to the drawings. An image-taking lens apparatus is an optical apparatus that optically takes in an image of a subject and then outputs it in the form of an electrical signal. An image-taking lens apparatus is used as a main component of a camera that is used to shoot a still or moving picture of a subject. Examples of such cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, and printers), and other digital appliances. As these examples show, by the use of an image-taking lens apparatus, it is possible not only to build a camera but also to incorporate an image-taking lens apparatus in various appliances to provide them with a camera capability. For example, it is possible to realize a digital appliance provided with an image input capability, such as a cellular phone furnished with a camera.

Incidentally, the term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking lens apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to an appliance connected to a network to permit exchange of images, including both those connected directly to a network and those connected to a network by way of an appliance, such as a personal computer, having an information processing capability).

Figure 9A:
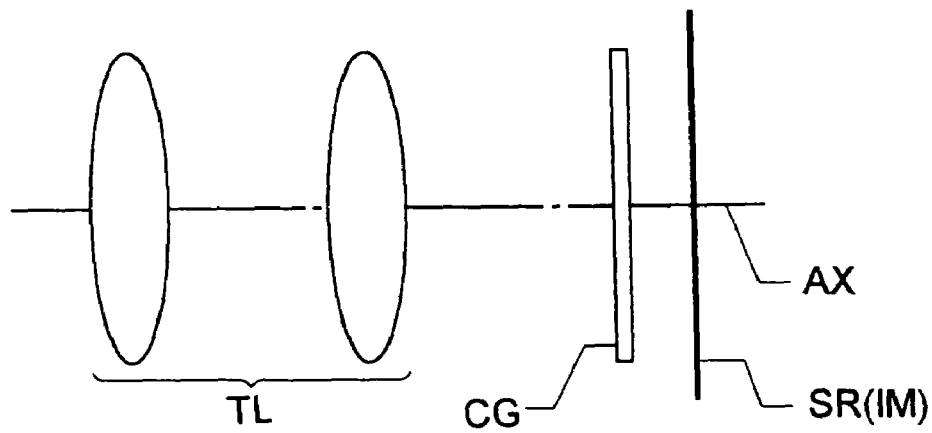
FIGS. 9A and 9B are diagrams schematically showing the optical construction of image-taking lens apparatuses embodying the invention.
Figure 9B:
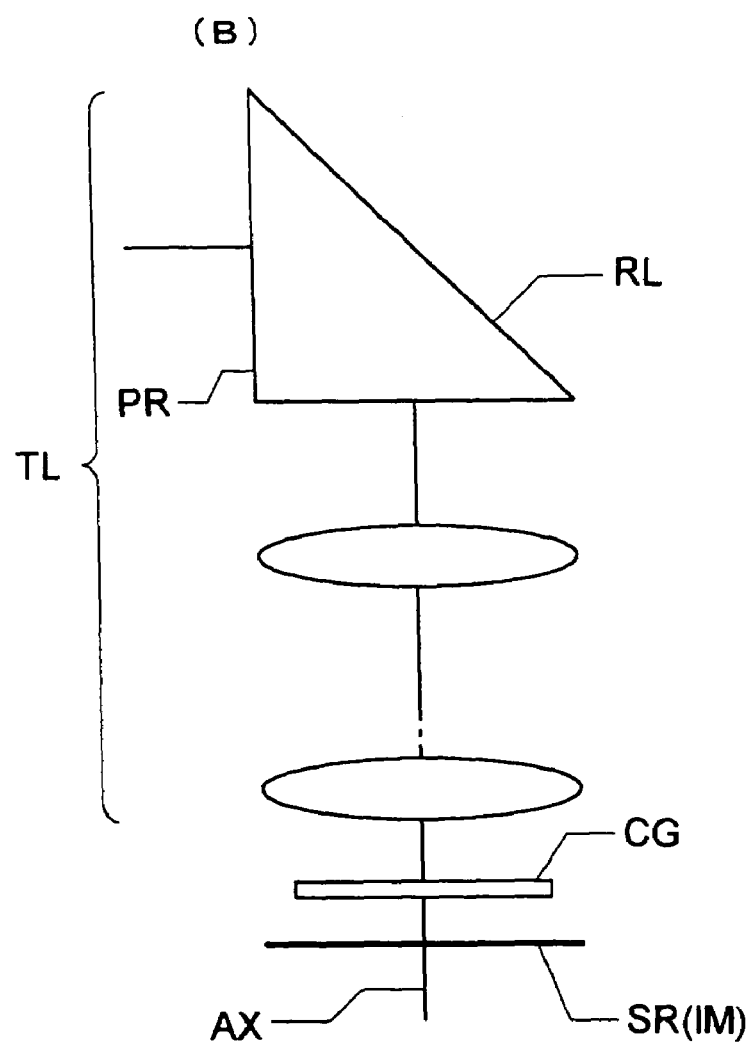

FIGS. 9A and 9B show examples of the construction of image-taking lens apparatuses. The image-taking lens apparatus shown in FIG. 9A has an optical construction of the type in which the optical path is not bent, and corresponds to the second embodiment (FIG. 2) described later. The image-taking lens apparatus shown in FIG. 9B has an optical construction of the type in which the optical path is bent, and corresponds to the first and third embodiments (FIGS. 1 and 4 and FIGS. 3 and 5, respectively). Either of these image-taking lens apparatuses is composed of, from the object (subject) side thereof, a zoom lens system TL (corresponding to an image-taking lens system) for forming an optical image (image plane IM) of an object at a variable magnification, a cover glass CG of an image sensor SR and the image sensor SR for converting the optical image IM formed on the light-receiving surface thereof by the zoom lens system TL into an electrical signal. The image-taking lens apparatus is used as a component of a digital appliance corresponding to a digital camera, portable data device (i.e., a compact and portable data equipment terminal such as a cellular phone or PDA), or the like. When this image-taking lens apparatus is incorporated in a digital camera, the image-taking lens apparatus is usually arranged inside the body of the camera. Here, the camera capability can be realized in a desired manner that suits particular needs. For example, the image-taking lens apparatus may be built as a unit that is freely detachable from or freely rotatable relative to the body of the camera; or the image-taking lens apparatus may be built as a unit that is freely detachable from or freely rotatable relative to a portable data device (such as a cellular phone or PDA).

The image-taking lens apparatus shown in FIG. 9B has a flat-surfaced reflecting surface RL arranged in the optical path of the zoom lens system TL. This reflecting surface RL bends the optical path so that the zoom lens system TL is used as a bending optical system. Here, the light beam is reflected in such a way that the optical axis AX is bent at about 90 degrees (i.e., precisely or substantially 90 degrees). By providing the reflecting surface RL for bending the optical path in the optical path of the zoom lens system TL in this way, it is possible to increase the flexibility in the arrangement of the image-taking lens apparatus, and it is also possible to vary the size of the image-taking lens apparatus in its thickness direction and thereby make it apparently slim.

The reflecting surface RL shown in FIG. 9B is realized with a rectangular prism. However, the reflecting member used here is not limited to a kind of prism; instead, a kind of mirror, such as a flat mirror, may be used as the reflecting member to realize the reflecting surface RL. The optical action used here to bend the optical path is not limited to reflection; instead, refraction, diffraction, or a combination thereof may be used. The prism PR shown in FIG. 9B has no optical power (an optical power denotes the quantity defined as the reciprocal of a focal length). However, the member for bending the optical path may be given an optical power. For example, by distributing part of the optical power of the zoom lens system TL to the reflecting surface RL of the prism PR, the light-entrance-side surface thereof, the light-exit-side surface thereof, or any other surface thereof, it is possible to alleviate the responsibility of the lens elements for the optical power and thereby enhance the optical performance. The optical path may be bent in front of, in the middle of, or behind the zoom lens system TL. Where to bend the optical path may be set appropriately to suit the actual needs. By appropriately bending the optical path, it is possible to make a digital appliance (such as a digital camera) apparently slim and compact.

The zoom lens system TL is composed of a plurality of lens units, and is so constructed as to vary the magnification (i.e., achieve zooming) by moving those lens units along the optical axis AX in such a way as to vary the distances between them. In all the embodiments described later, the zoom lens system TL has a three-unit zoom construction composed of a negative, a positive, and a positive optical power. For example, in the type shown in FIG. 9A, zooming is performed with the third lens unit GR3 kept stationary; in the type shown in FIG. 9B, zooming is performed with the first lens unit GR1, which includes the prism PR, kept stationary.

Used as the image sensor SR is a solid-state image sensor such as a CCD (charge-coupled device) or CMOS (complementary metal oxide semiconductor) sensor having a plurality of pixels. The optical image formed by the zoom lens system TL (on the light-receiving surface of the image sensor SR) is converted into an electrical signal by the image sensor SR. The signal produced by the image sensor SR is subjected to predetermined digital image processing, image compression processing, and the like as required, and is recorded in a memory (such as a semiconductor memory or an optical disk) as a digital video signal; in some cases, the signal is transferred to another appliance through a cable or after being converted into an infrared signal.

In the image-taking lens apparatuses shown in FIGS. 9A and 9B, the zoom lens system TL performs reduction-projection from the subject located on the enlargement side to the image sensor SR located on the reduction side. It is, however, also possible to use instead of the image sensor SR a display device (for example, a liquid crystal display device) that displays a two-dimensional image, and use the zoom lens system TL as a projection lens system. In this way, it is possible to realize an image projection apparatus that performs enlargement-projection from the image display surface located on the reduction side to a screen surface located on the enlargement side. That is, the zoom lens systems TL of all the embodiments described below can be suitably used not only as an image-taking lens system but also as a projection lens system.

Figure 1:
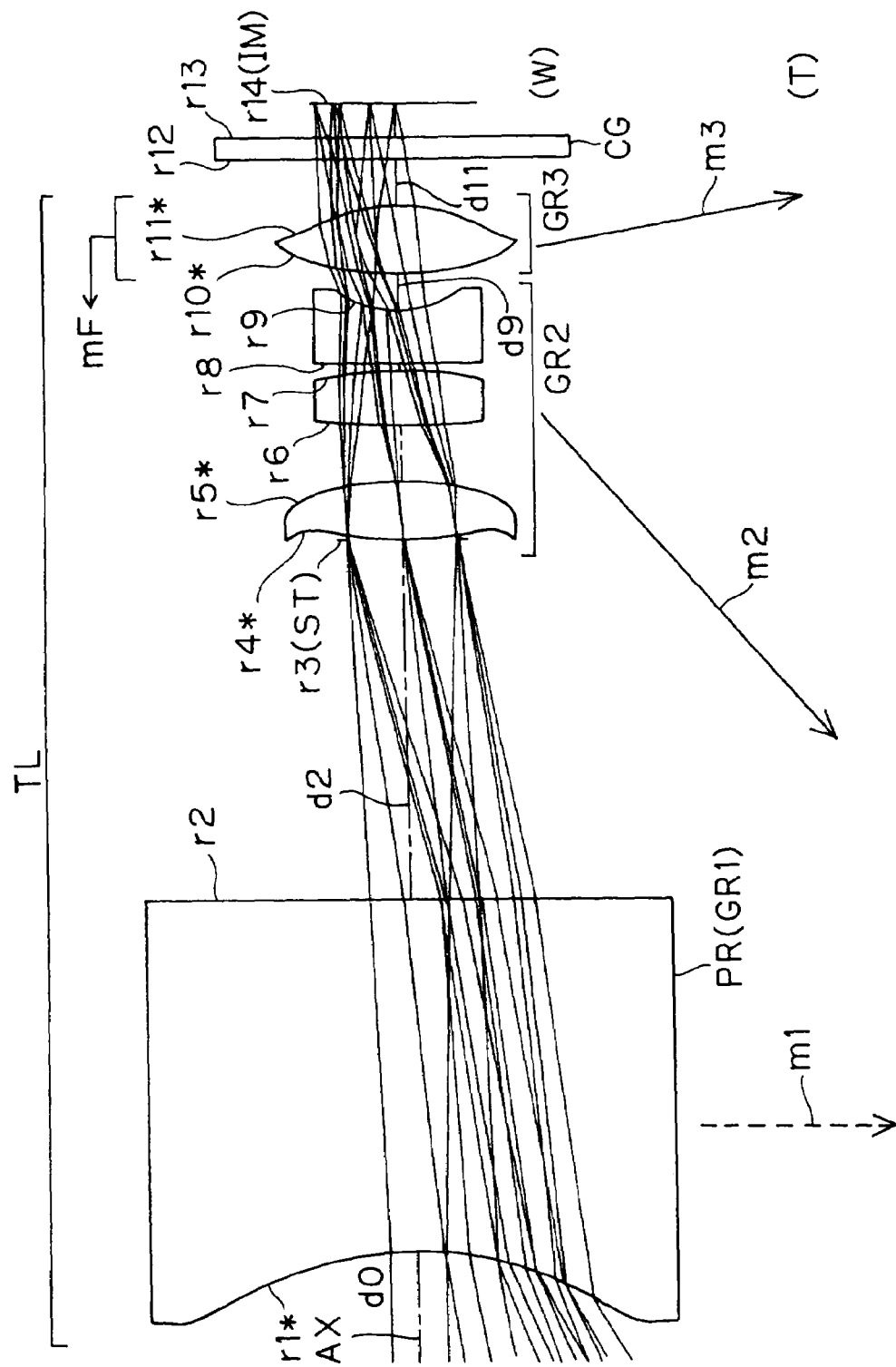
FIG. 1 is an optical construction diagram of a first embodiment (Example 1) of the invention, showing its optical path and lens arrangement with the optical path straightened.
Figure 2:
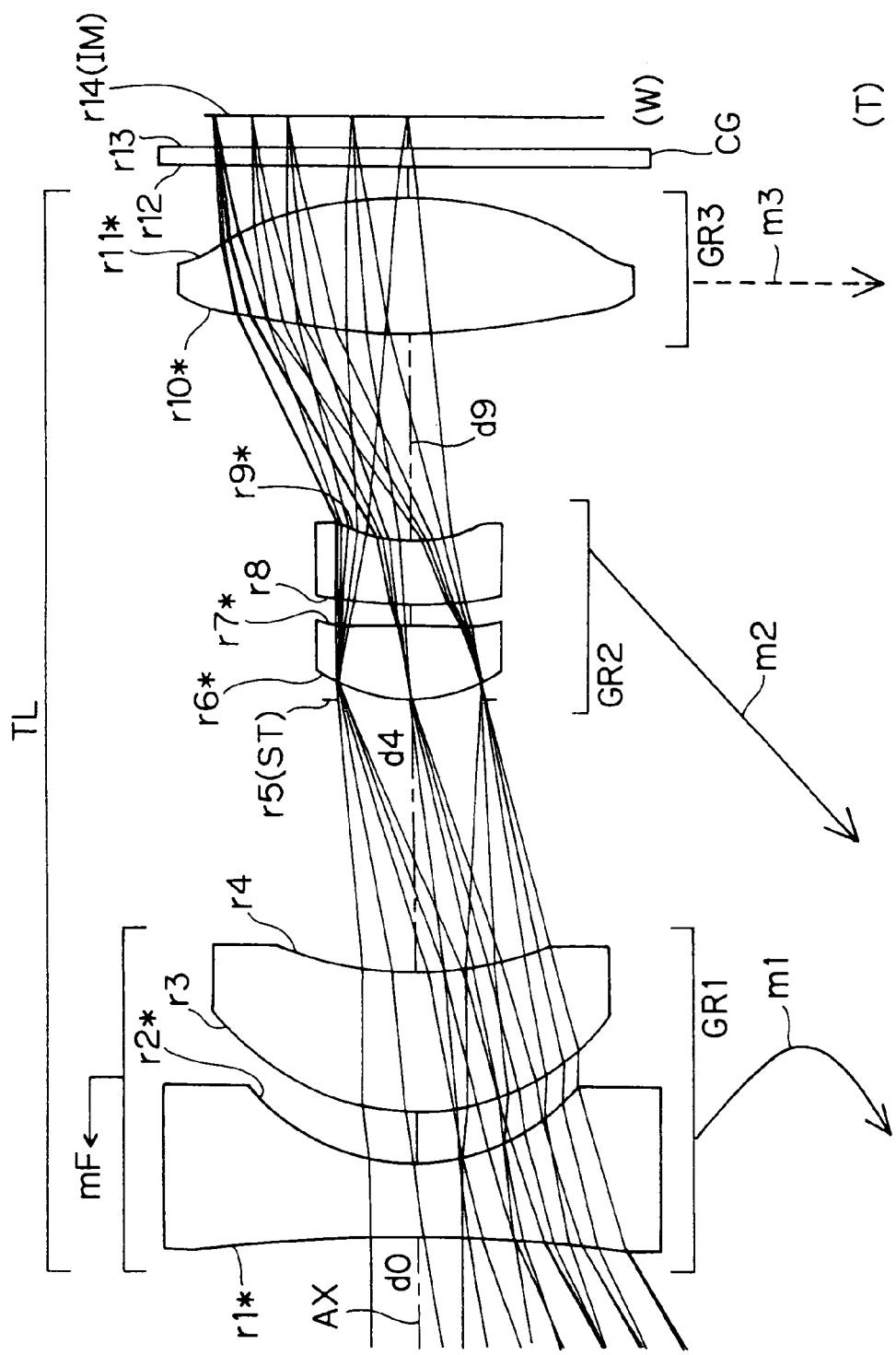
FIG. 2 is an optical construction diagram of a second embodiment (Example 2) of the invention, showing its optical path and lens arrangement with the optical path straightened.
Figure 3:
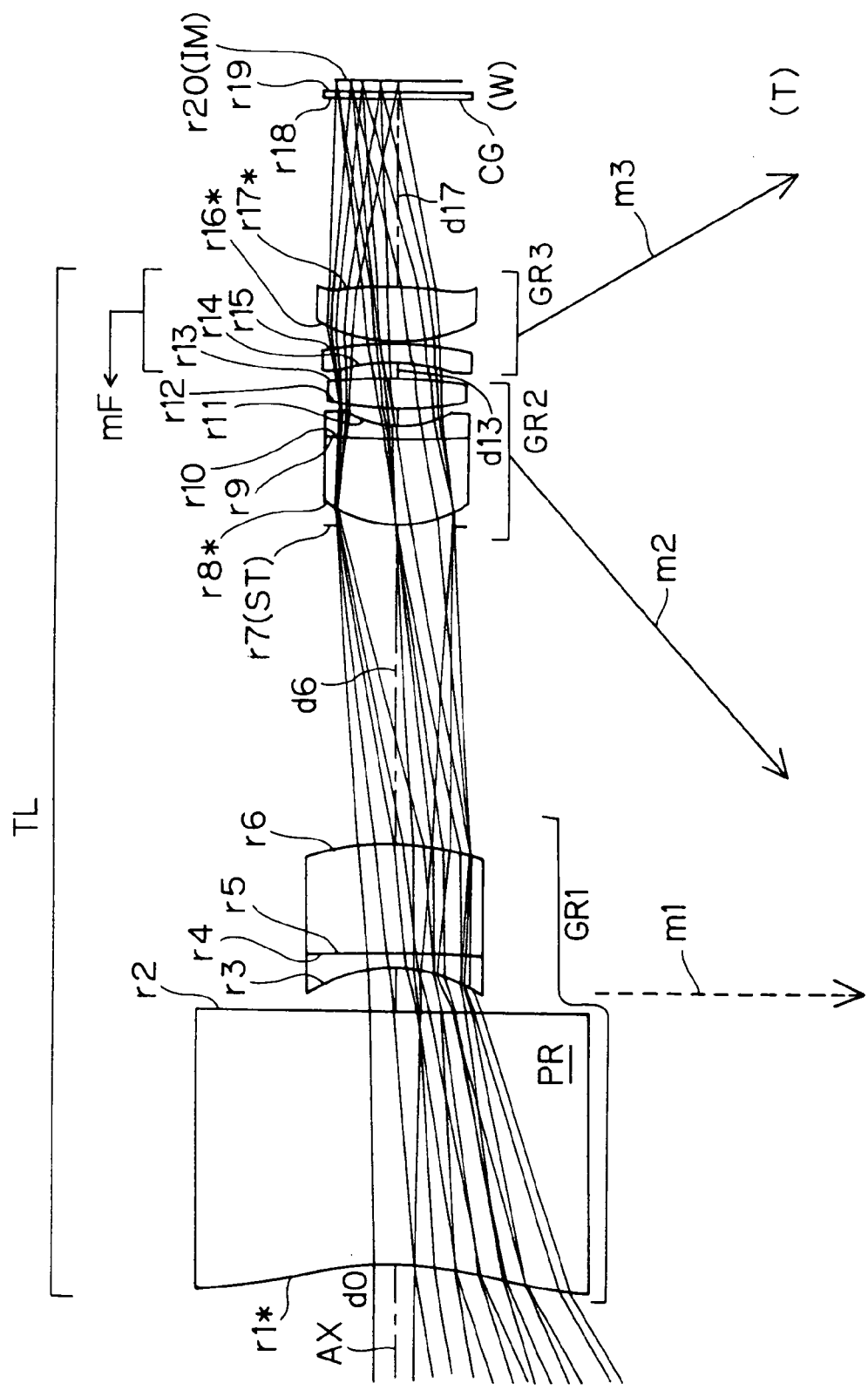
FIG. 3 is an optical construction diagram of a third embodiment (Example 3) of the invention, showing its optical path and lens arrangement with the optical path straightened.
Figure 4:
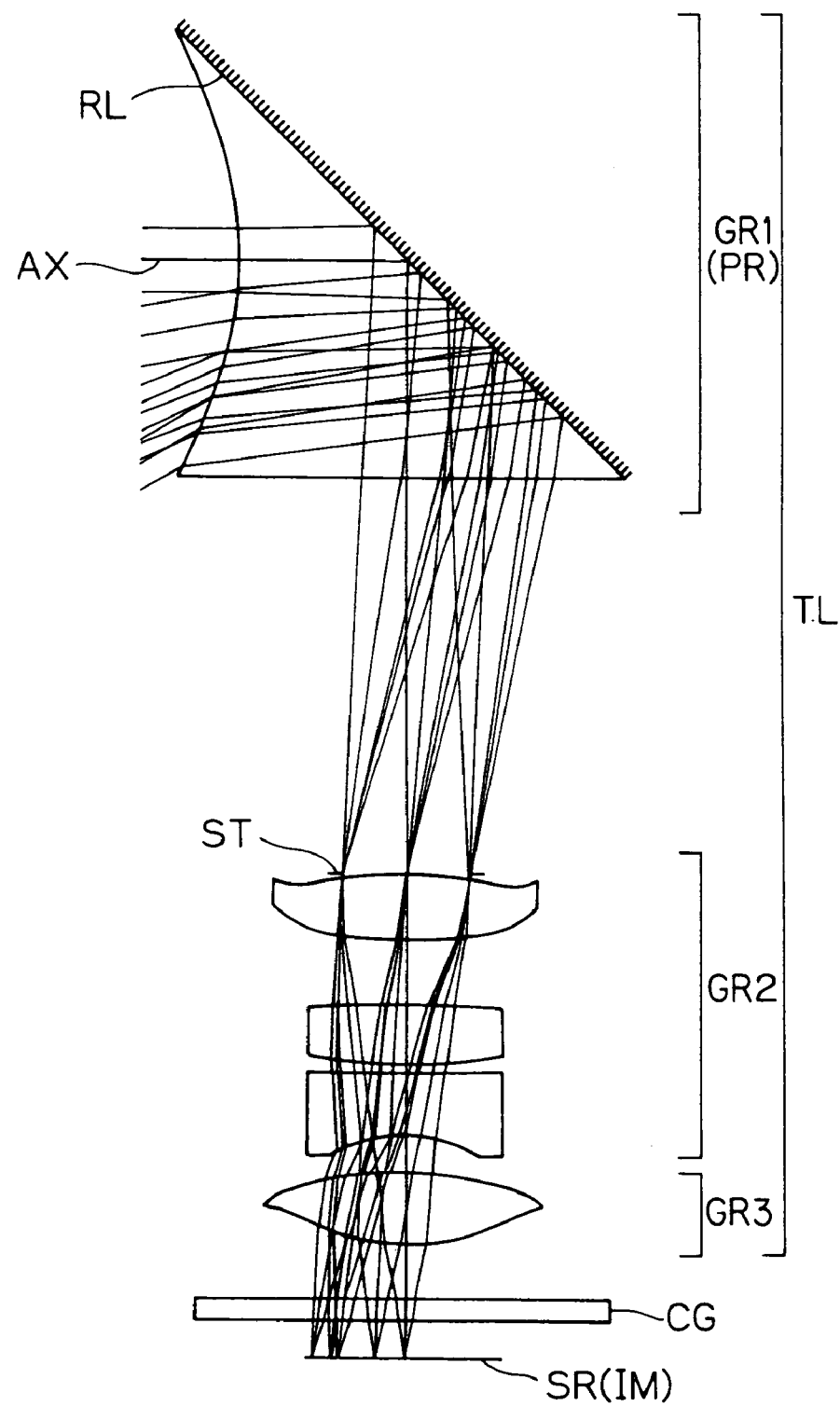
FIG. 4 is an optical construction diagram of the first embodiment (Example 1) of the invention, showing its optical path and lens arrangement with the optical path bent.
Figure 5:
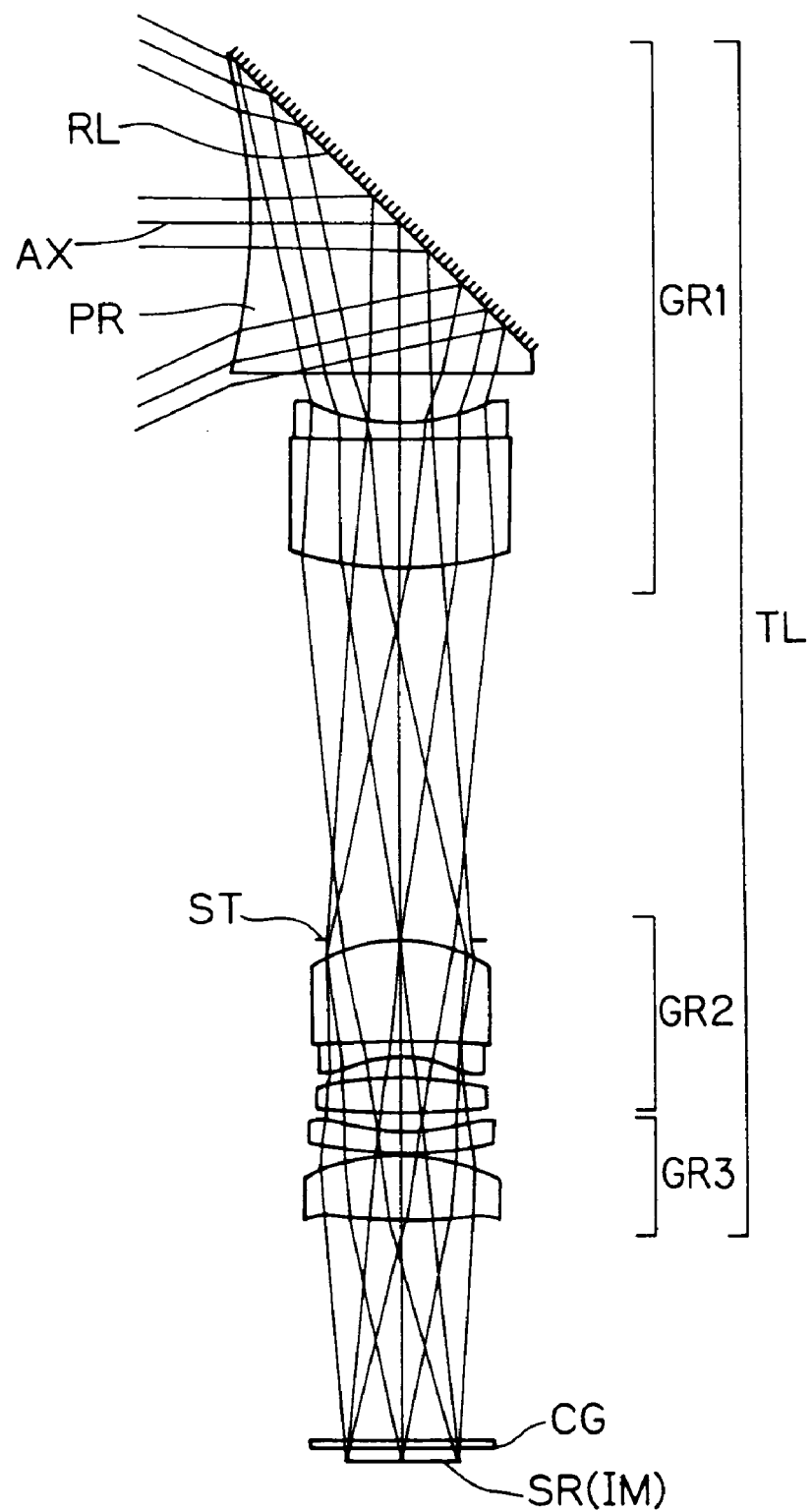
FIG. 5 is an optical construction diagram of the third embodiment (Example 3) of the invention, showing its optical path and lens arrangement with the optical path bent.
Figure 7A:
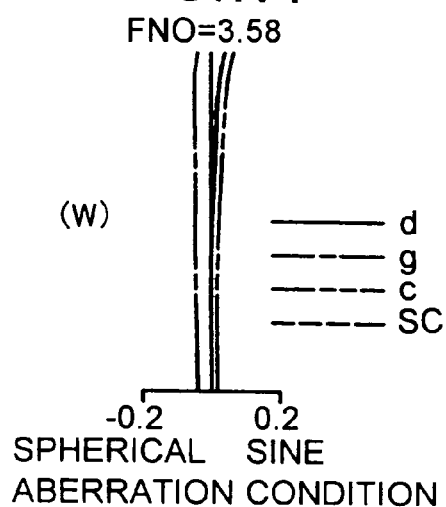
FIGS. 7A to 7I are aberration diagrams of Example 2.
Figure 7B:
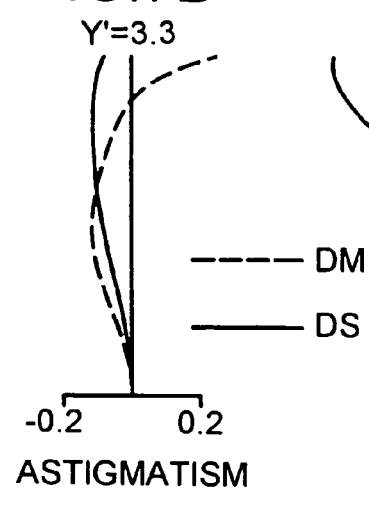
Figure 7C:
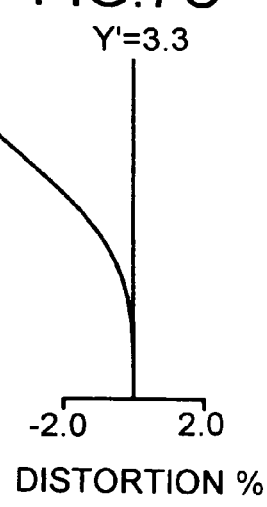
Figure 7D:
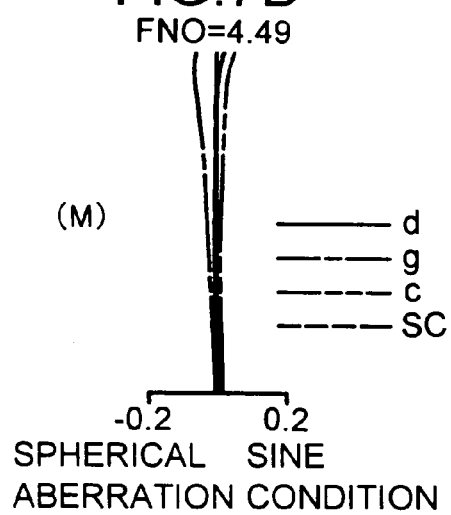
Figure 7E:
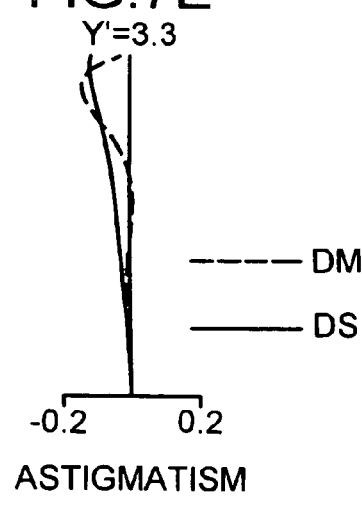
Figure 7F:
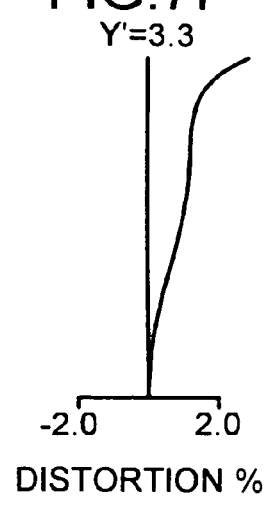
Figure 7G:
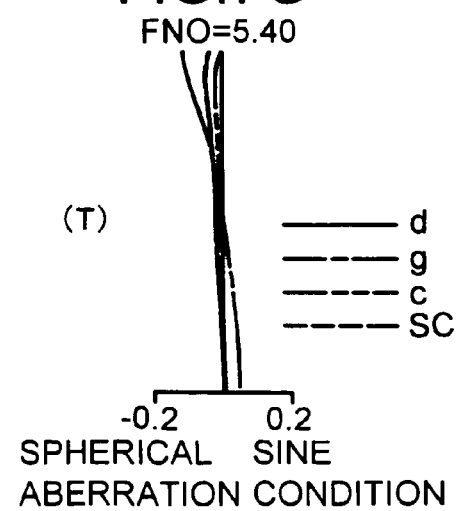
Figure 7H:
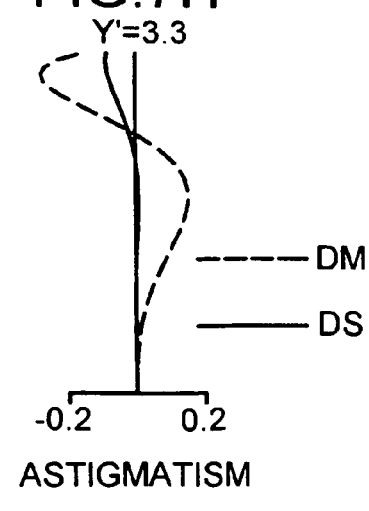
Figure 7I:
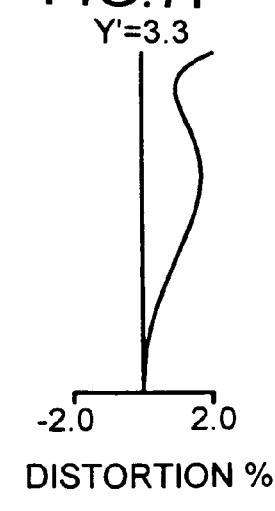

FIGS. 1 to 3 are optical construction diagrams of the zoom lens systems TL of a first to a third embodiment of the invention, respectively, each showing the lens construction, optical path, and other fetuses of the corresponding zoom lens system as observed at the wide-angle end W in an optical section along a straightened optical path. FIGS. 4 and 5 are optical construction diagrams of the zoom lens systems TL of the first and third embodiments, respectively, each showing the lens construction, optical path, and other fetuses of the corresponding zoom lens system as observed at the wide-angle end W in an optical section along a bent optical path. In FIGS. 1 to 3, arrows m1, m2, and m3 schematically indicate the movement of the first, second, and third lens units GR1, GR2, and GR3, respectively, during zooming from the wide angle end W to the telephoto end T, and a broken-line arrow indicates that the corresponding lens unit remains in a fixed position during zooming. Moreover, an arrow mF schematically indicates the movement of the focus lens unit during focusing from the infinite shooting distance to a close-up shooting distance.

In FIGS. 1 to 3, a surface marked as ri (i=1, 2, 3, . . . ) is the i-th surface from the object side (with an asterisk (*) following ri indicating an aspherical surface), and an axial distance marked as di (i=1, 2, 3, . . . ) is the i-th axial distance from the object side, though only those axial distances which vary as zooming is performed, i.e., variable axial distances, are shown here (with d0 representing the object distance). In all of the first to third embodiments, the zoom lens system TL is constructed as a three-unit zoom lens system that is composed of, from the object side thereof, a first lens unit GR1 having a negative optical power, a second lens unit GR2 having a positive optical power, and a third lens unit GR3 having a positive optical power and that achieves zooming by moving the first and second lens units GR1 and GR2, or the second and third lens units GR2 and GT3, in such a way as to vary the distances between the individual lens units. Now, the lens construction of each embodiment will be described in more detail.

In the first embodiment (FIG. 1), in a three-unit zoom construction composed of a negative, a positive, and a positive lens unit, each lens unit is built as follows. The first lens unit GR1 is composed solely of a prism PR. This prism PR has a reflecting surface RL (FIG. 4) for bending the optical axis AX at 90 degrees. The entrance-side surface of the prism PR is an aspherical surface concave to the object side. The second lens unit GR2 is composed of, from the object side, an aperture stop ST, a biconvex positive lens element having aspherical surfaces on both sides, a biconvex positive lens element, and a biconcave negative lens element. The third lens unit GR3 is composed solely of a biconvex positive lens element having aspherical surfaces on both sides.

In the second embodiment (FIG. 2), in a three-unit zoom construction composed of a negative, a positive, and a positive lens unit, each lens unit is built as follows. The first lens unit GR1 is composed of, from the object side, a negative biconcave lens element having aspherical surfaces on both sides and a positive meniscus lens element convex to the object side. The second lens unit GR2 is composed of, from the object side, an aperture stop ST, a positive biconvex lens element having aspherical surfaces on both surfaces, and a negative meniscus lens element concave to the image side and having an aspherical surface on the image side. The third lens unit GR3 is composed solely of a positive biconvex lens element having aspherical surfaces on both sides.

In the third embodiment (FIG. 3), in a three-unit zoom construction composed of a negative, a positive, and a positive lens unit, each lens unit is built as follows. The first lens unit GR1 is composed of, from the object side, a prism PR and a cemented lens element formed by cementing together a negative meniscus lens element concave to the object side and a positive meniscus lens element convex to the image side. This prism PR has a reflecting surface RL (FIG. 5) for bending the optical axis AX at 90 degrees. The entrance-side surface of the prism PR is an aspherical surface concave to the object side. The second lens unit GR2 is composed of, from the object side, an aperture stop ST, a cemented lens element formed by cementing together a positive meniscus lens element convex to the object side and having an aspherical surface on the object side and a negative meniscus lens element concave to the image side, and a positive biconvex lens element. The third lens unit GR3 is composed of, from the object side, a negative meniscus lens element concave to the object side and a positive biconvex lens element having aspherical surfaces on both sides.

Incidentally, the greatest hurdle to miniaturizing a camera is the optical total length (i.e., the length from the most object-side surface of an optical system to the image plane). Ways to shorten the optical total length include, to name a few, giving the individual lens elements higher refractive indices, giving the individual surfaces sharper curvatures, and reducing the number of lens elements used. However, these methods are expected to cause problems, as by affecting the aberrations produced, and by making the manufacture of the lens system difficult due to the higher sensitivity to errors resulting from the stronger optical powers of the individual lens elements. The most effective way to surely shorten the optical total length without causing any such problems is to shorten the back focal length of the image-taking lens system.

Aiming at moderate, i.e., lower than optimum, performance around the resolution limit frequency makes it possible to disregard the generation of noise without the use of an optical low-pass filter. Moreover, in a case where the user shoots or observes images by the use of a display system (such as the liquid crystal display screen of a cellular phone or the like) on which noise is inconspicuous, there is no need to use an optical low-pass filter in the image-taking lens system. Accordingly, in an image-taking lens apparatus that does not require an optical low-pass filter, simply locating the exit pupil at an appropriate position makes it possible to reduce the back focal length and thereby miniaturize the image-taking lens apparatus and the camera incorporating it. From these perspectives, it is preferable to adopt a construction as described below.

In a negative-led zoom lens system composed of three or more lens units, to shorten the optical total length and thereby achieve compactness while securing a sufficient image height and high performance, it is preferable that conditional formula (1) below be fulfilled.

$$0.1 < Bf/Y' < 1.0 \tag{1}$$

where $Bf$ represents the axial distance from the last lens surface to the image plane (in a case where the last lens element is movable during zooming, the minimum axial distance there throughout the zoom range); and $Y'$ represents half the diagonal length of the image-sensing area.

Conditional formula (1) defines the conditional range that should preferably be fulfilled by the relationship between the maximum image height (i.e., half the diagonal length of the image-sensing surface) and the back focal length. Disregarding the lower limit of conditional formula (1) results in making the axial distance from the last lens surface to the surface of the solid-state image sensor (the image-sensing surface) so short that dust particles settled on the last lens surface or the like exert a great influence. In general, the shorter the distance from the last lens surface to the surface of the solid-state image sensor, the smaller the permissible size of dust particles, and thus the larger the investment that needs to be made in the manufacturing process (for example, for a clean room). By contrast, if the upper limit of conditional formula (1) is disregarded, the back focal length is too long relative to the size of the solid-state image sensor, making the optical system unsatisfactorily compact.

To reduce the optical total length and thereby achieve compactness, it is further preferable that conditional formula (1a) below be fulfilled.

$$0.1 < Bf/Y' < 0.7 \tag{1a}$$

This conditional formula (1a) defines a further preferable conditional range within that defined by conditional formula (1) above from the above-mentioned viewpoints and out of other considerations.

In a negative-led zoom lens system composed of three or more lens units, to reduce the optical total length and thereby achieve compactness while securing an appropriate exit pupil position and high performance, it is preferable that conditional formula (2) below be fulfilled.

$$0.1 < Bf/fw < 0.8 \tag{2}$$

where $Bf$ represents the axial distance from the last lens surface to the image plane (in a case where the last lens element is movable during zooming, the minimum axial distance there throughout the zoom range); and fw represents the focal length of the zoom lens system as a whole at the wide-angle end.

Conditional formula (2) defines the conditional range that should preferably be fulfilled by the relationship between the focal length of the entire system at the wide-angle end and the back focal length. If the lower limit of conditional formula (2) is disregarded, the back focal length is so short that the exit pupil is located very close to the image plane. This causes the off-axial rays exiting from the zoom lens system to be obliquely incident on the image plane no matter how ingeniously the microlenses provided in front of the solid-state image sensor are fitted. This makes it impossible to fully exploit the light-condensing ability of the microlenses provided in front of the solid-state image sensor, resulting in lower or uneven brightness and the like. In a zoom lens system with a short back focal length, securing satisfactory brightness at the wide-angel end thereof is one of the difficult problems to overcome. Even if the first lens unit is given a stronger optical power with a view to locating the exit pupil away from the image plane, it is difficult to secure a sufficient distance from the exit pupil to the image plane while satisfactorily correcting the distortion at the wide-angle end. By contrast, if the upper limit of conditional formula (2) is disregarded, the back focal length is too long, making the optical system unsatisfactorily compact.

To shorten the optical total length and thereby achieve compactness, it is further preferable that conditional formula (2a) below be fulfilled $$0.1 < Bf/fw < 0.6 \qquad (2a)$$

This conditional formula (2a) defines a further preferable conditional range within that defined by conditional formula (2) above from the above-mentioned viewpoints and out of other considerations.

In a negative-led zoom lens system composed of three or more lens units, to reduce the optical total length and thereby achieve compactness while securing an appropriate exit pupil position and high performance, it is preferable that conditional formula (3) below be fulfilled.

$$0.01 < Bf/Lw < 0.2 \qquad (3)$$

where
  Bf represents the axial distance from the last lens surface to the image plane (in a case where the last lens element is movable during zooming, the minimum axial distance there throughout the zoom range); and
  Lw represents the optical total length (i.e., the length from the most object-side surface of the zoom lens system to the image plane) at the wide-angle end.

Conditional formula (3) defines the conditional range that should preferably be fulfilled by the relationship between the optical total length at the wide-angle end and the back focal length. If the lower limit of conditional formula (3) is disregarded, the back focal length is so short that the exit pupil is located very close to the image plane. This causes the off-axial rays exiting from the zoom lens system to be obliquely incident on the image plane no matter how ingeniously the microlenses provided in front of the solid-state image sensor are fitted. This makes it impossible to fully exploit the light-condensing ability of the microlenses provided in front of the solid-state image sensor, resulting in lower or uneven brightness and the like. In a zoom lens system with a short back focal length, securing satisfactory brightness at the wide-angel end thereof is one of the difficult problems to overcome. Even if the first lens unit is given a stronger optical power with a view to locating the exit pupil away from the image plane, it is difficult to secure a sufficient distance from the exit pupil to the image plane while satisfactorily correcting the distortion at the wide-angle end. By contrast, if the upper limit of conditional formula (3) is disregarded, the back focal length is too long relative to the optical total length, making the optical system unsatisfactorily compact.

To shorten the optical total length and thereby achieve compactness, it is further preferable that conditional formula (3a) below be fulfilled $$0.01 < Bf/Lw < 0.12 \qquad (3a)$$

This conditional formula (3a) defines a further preferable conditional range within that defined by conditional formula (3) above from the above-mentioned viewpoints and out of other considerations.

In a negative-lead zoom lens system composed of three or more units,-to shorten the optical total length and thereby achieve compactness while securing high performance, it is preferable that conditional formula (4) below be fulfilled.

$$1 < Bf/D < 10 \qquad (4)$$

where
  Bf represents the axial distance from the last lens surface to the image plane (in a case where the last lens element is movable during zooming, the minimum axial distance there throughout the zoom range); and
  D represents the axial distance from the last lens surface to the front surface of the cover glass of the image sensor (in a case where the last lens element is movable during zooming, the minimum axial distance there throughout the zoom range).

Conditional formula (4) defines the conditional range that should preferably be fulfilled by the relationship between the back focal length as a whole and the portion thereof up to the cover glass. If the lower limit of conditional formula (4) is disregarded, the last lens surface and the surface of the cover glass are too close to each other, causing problems (such as flare and ghosts) resulting from reflection of rays between surfaces. By contrast, if the upper limit of conditional formula (4) is disregarded, the back focal length is too long, making the optical system unsatisfactorily compact.

To shorten the optical total length and thereby achieve compactness, it is further preferable that conditional formula (4a) below be fulfilled.

$$1 < Bf/D < 9 \qquad (4a)$$

This conditional formula (4a) defines a further preferable conditional range within that defined by conditional formula (4) above from the above-mentioned viewpoints and out of other considerations.

In a zoom lens system, like the zoom lens system TL of any of the embodiments, in which the first lens unit GR1 has a negative optical power, it is, in general, extremely difficult to correct the distortion and curvature of field that appear at the wide-angle end W. This problem can usually be overcome by increasing the number of lens elements used, but increasing the number of lens elements results in making the total lens length longer. Moreover, to obtain the same optical power without increasing the number of lens elements, it is necessary to give the individual lens elements stronger optical powers. Giving them stronger optical powers, however, results in larger curvature of field. To overcome this problem, it is preferable to use an aspherical surface on the lens element that is located at the object-side end (i.e., the first lens element), and it is further preferable to use as the first lens element an aspherical surface that is so designed that, the farther away from the optical axis AX, the weaker the negative optical power of the first lens elements. In the first to third embodiments, introducing an aspherical surface into the first lens element helps correct the distortion, astigmatism, and other aberrations that are inevitable in those constructions.

In a zoom lens system, like the zoom lens system TL of any of the embodiments, in which the first lens unit GR1 has a negative optical power, it is preferable that at least one of conditional formulae (5) and (6) be fulfilled.

$$-0.8 < P1/Pw < -0.1 \quad (5)$$

$$-1.5 < P1/Pt < -0.5 \quad (6)$$

where

P1 represents the optical power of the first lens unit; and
Pw represents the optical power of the zoom lens system as a whole at the wide-angle end; and
Pt represents the optical power of the zoom lens system as a whole at the telephoto end.

Conditional formulae (5) and (6) define the conditional ranges that should preferably be fulfilled by the optical power of the first lens unit. If the lower limit of conditional formula (5) or (6) is disregarded, the negative optical power of the first lens unit is so strong as to produce large barrel-shaped distortion. This makes it impossible to satisfactorily correct distortion. Moreover, the relevant lens element or prism needs to be given a sharp curvature. This increases the sensitivity to errors, and thus makes not only the manufacture of the zoom lens system but also the manufacture of that lens element or prism difficult. By contrast, if the upper limit of conditional formula (5) or (6) is disregarded, the negative optical power of the first lens unit is so weak as to produce large pincushion-shaped distortion at the wide-angle end. This makes it impossible to satisfactorily correct distortion.

It is further preferable that at least one of conditional formulae (5a) and (6a) below be fulfilled.

$$-0.6 < P1/Pw < -0.2 \quad (5a)$$

$$-1.2 < P1/Pt < -0.6 \quad (6a)$$

These conditional formulae (5a) and (6a) define further preferable conditional ranges within those defined by conditional formulae (5) and (6) above from the above-mentioned viewpoints and out of other considerations.

In a zoom lens system, like the zoom lens system TL of any of the embodiments, in which the third lens unit GR3 has a positive optical power, it is preferable that at least one of conditional formulae (7) and (8) be fulfilled.

$$0.15 < P3/Pw < 0.85 \quad (7)$$

$$0.5 < P3/Pt < 2.5 \quad (8)$$

where

P3 represents the optical power of the third lens unit;
Pw represents the optical power of the zoom lens system as a whole at the wide-angle end; and
Pt represents the optical power of the zoom lens system as a whole at the telephoto end.

The conditional formulae (7) and (8) define the conditional ranges that should preferably be fulfilled by the optical power of the third lens unit. If the lower limit of conditional formula (7) or (8) is disregarded, the positive optical power of the third lens unit is so weak that it is impossible to locate the exit pupil at an appropriate position. Securing a long back focal length with a view to locating the exit pupil at an appropriate position results in making the optical system unsatisfactorily compact. By contrast, if the upper limit of conditional formula (7) or (8) is disregarded, the positive optical power of the third lens unit is so strong that the exit pupil is located in an overtelecentric position, making uneven brightness likely. Moreover, with the exit pupil located in an overtelecentric position, the third lens unit has a large lens diameter.

It is further preferable that at least one of conditional formulae (7a) and (8a) below be fulfilled.

$$0.2 < P3/Pw < 0.8 \quad (7a)$$

$$0.6 < P3/Pt < 2.3 \quad (8a)$$

These conditional formulae (7a) and (8a) define further preferable conditional ranges within those defined by conditional formulae (7) and (8) above from the above-mentioned viewpoints and out of other considerations.

In a negative-lead zoom lens system composed of three or more lens units, to shorten the optical total length and thereby achieve compactness while securing an appropriate exit pupil position and high performance, it is preferable that conditional formula (9) below be fulfilled.

$$0.2 < P23/Pw < 1.0 \quad (9)$$

where

P23 represents the composite optical power of the second and third lens units; and
Pw represents the optical power of the zoom lens system as a whole at the wide-angle end.

Conditional formula (9) defines the conditional range that should preferably be fulfilled by the composite optical power of the second and third lens units. If the lower limit of conditional formula (9) is disregarded, the composite optical power of the second and third lens units is so weak that the exit pupil is located too far to the object side. This makes it difficult to correct the aberrations, in particular astigmatism, that appear in the long-focal-length region of the zoom range. By contrast, if the upper limit of conditional formula (9) is disregarded, the composite optical power of the second and third lens unit is so strong that the exit pupil is located too close to the image side. This makes it difficult to secure sufficient image-plane brightness in the short-focal-length region of the zoom range.

It is further preferable that conditional formula (9a) below be fulfilled $$0.3 < P23/Pw < 0.7 \quad (9a)$$

This conditional formula (9a) defines a further preferable conditional range within that defined by conditional formula (9) above from the above-mentioned viewpoints and out of other considerations.

It is preferable that the most image-side lens element of the last lens unit (for example, in a three-unit zoom lens system composed of a negative, a positive, and a positive lens unit, the third lens unit) fulfill conditional formula (10) below.

$$-0.15 < (R1+R2)/(R1-R2) < 0.5 \quad (10)$$

where

R1 represents the radius of curvature of the object-side surface of the lens element disposed at the most image-side end of the last lens unit; and R2 represents the radius of curvature of the image-side surface of the lens element disposed at the most image-side end of the last lens unit.

Conditional formula (10) defines the conditional range that should preferably be fulfilled by the last lens element for well-balanced correction of off-axial aberrations such as distortion, coma, and astigmatic. Fulfilling the conditional formula (10) contributes not only to the correction of off-axial aberrations but also to locating the exit pupil at an appropriate distance throughout the zoom range from the wide-angle end W to the telephoto end T. If the lower limit of conditional formula (10) is disregarded, ghosts are likely to result from reflection between the last lens element and the cover glass. By contrast, if the upper limit of conditional formula (10) is disregarded, off-axial aberrations are likely to worsen due to the increased curvatures of the lens element. Either way, if the range defined by conditional formula (10) is disregarded, it is difficult to correct off-axial aberrations in a well-balanced manner.

It is further preferable that conditional formula (10a) below be fulfilled $$-0.1<(R1+R2)/(R1-R2)<0.4 \qquad (10a)$$

This conditional formula (10a) defines a further preferable conditional range within that defined by conditional formula (10) above from the above-mentioned viewpoints and out of other considerations.

To permit the exit pupil to be located in an appropriate position even with a short back focal length, it is preferable to arrange an aperture stop in the second lens unit. In all the embodiments, an aperture stop ST is arranged at the most object-side end of the second lens unit GR2. However, the aperture stop ST may be arranged on the image side or in the middle of the second lens unit GR2. In addition to the aperture stop ST, a beam restricting plate or the like for cutting unnecessary light may be arranged as necessary.

In the first and third embodiments (FIGS. 1 and 3), the last lens unit is movable. It is, however, also possible to add a stationary lens unit as the last lens unit. Specifically, it is possible to arrange, near the image plane IM, a lens unit (for example, a lens unit having a light-condensing function) that is kept in a fixed position relative to the image plane IM during zooming from the wide-angle end W to the telephoto end T. Adding near the image plane IM a positively or negatively powered lens unit that is kept in a fixed position during zooming is expected to slightly enhance the performance.

As described earlier, in the zoom lens system TL of the first and third embodiments (FIGS. 4 and 5), the first lens unit GR1 includes the prism PR as a reflecting member. The prism PR used there is a rectangular prism, and is so designed as to reflect a light beam with its internal reflecting surface RL in such a way that the optical axis AX of the zoom lens system TL is bent at about 90°. The prism PR does not necessarily have to be a rectangular prism; it may be so designed as to reflect a light beam with two or more reflecting surfaces RL in such a way that the optical axis AX of the zoom lens system TL is bent at about 90°.

The prism PR used in the first and third embodiments has an optical power only at its light-entrance-side surface. However, its light-exit-side surface may also be given an optical power. That is, at least one of the light-entrance-side and light-exit-side surfaces of the prism PR may be given a curvature. The optical power here is not limited to one resulting from refraction, but may be one resulting from diffraction or a combination of refraction and diffraction. Instead of the reflecting surface RL, a refractive or diffractive surface may be used to bend the optical axis AX; alternatively, the reflecting surface RL of the reflecting member may be given an optical power as described just above.

The prism PR used in the first and third embodiments is an internal-reflection prism. However, the prism PR is not limited to that type of prism. The reflective member that provides the reflective surface RL may be realized by the use of any of a surface-reflection prism, an internal-reflection flat mirror, a surface-reflection flat mirror, and the like. While an internal-reflection prism reflects the object light inside itself, a surface-reflection prism reflects the object light with a surface thereof serving as the reflective surface RL without letting the object light enter it. On the other hand, while a surface-reflection flat mirror reflects the object light with a mirror surface thereof serving as the reflective surface RL, an internal-reflection flat mirror reflects, with the back surface of a glass plate serving as the reflective surface RL, the object light that has entered the glass plate. The reflective surface RL does not have to be a perfectly total-reflection surface. That is, the reflectivity of part of the reflective surface RL may be appropriately adjusted so as to make part of the object light branch off and strike a sensor for metering or distance measurement. The reflectivity of the entire reflective surface RL may be adjusted appropriately so as to split the object light into two beams and direct one to a viewfinder.

In the second embodiment (FIG. 2), focusing at a close distance is achieved by moving out the first lens unit GR1 toward the object side (as indicated by the arrow mF); in the first and third embodiments (FIGS. 1 and 3), focusing at a close distance is achieved by moving out the third lens unit GR3 toward the object side (as indicated by the arrow mF). Conventionally, zooming is achieved by driving a plurality of lens units by the use of the drive power transmitted thereto from a single drive device through a zoom cam, and focusing is achieved by driving a focus lens unit by the use of the drive power of a separate drive device. However, in a construction, as in all the embodiments, where there are two lens units that are moved for zooming or focusing, a drive device can be connected directly to those two lens units without using a cam or the like. It is preferable to achieve zooming and focusing by controlling the distances traveled by the individual lens units, because this eliminates the need for a cam and thus helps simplify the construction, leading to compactness.

In all the embodiments, the zoom lens system TL is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material.

It is to be understood that the embodiments described above and the practical examples described later include the constructions (Z1) to (Z3), (U1), (C1) to (C2), and (D1) to (D2) described below, and with these constructions, it is possible to realize zoom lens systems that are made compact as a result of shortening their back focal length while maintaining high optical performance ensuring high image quality throughout the zoom range. By using them as image-taking lens systems in digital cameras, portable data devices (such as cellular phones and PDAs), and the like, it is possible to contribute to making such devices lightweight, compact, inexpensive, high-performance, intelligent, and otherwise better.

(Z1) A zoom lens system comprising a plurality of lens units and achieving zooming by varying the distances between the lens units, the zoom lens system including, from the object side thereof, a first lens unit having a negative optical power, a second lens unit having a positive optical power, and a third lens unit, wherein one of conditional formulae (1), (1a), (2), (2a), (3), (3a), (4), (4a), (5), (5a), (6), (6a), (7), (8), (8a), (9), (9a), (10), and (10a) noted earlier is fulfilled.

(Z2) A zoom lens system as described in (Z1) above, wherein the zoom lens system is composed solely of, from the object side thereof, a first lens unit having a negative optical power, a second lens unit having a positive optical power, and a third lens unit having a positive optical power.

(Z3) A zoom lens system as described in (Z1) or (Z2) above, wherein the second lens unit includes an aperture stop.

(U1) An image-taking lens apparatus comprising a zoom lens system as described in one of (Z1) to (Z3) above and an image sensor for converting the optical image formed by the zoom lens system into an electrical signal.

(C1) A camera comprising an image-taking lens apparatus as described in (U1) above so as to have at least one of a capability of shooting a still picture of a subject and a capability of shooting a moving picture of a subject.

(C2) A camera as described in (C1) above, wherein the camera is a digital camera, video camera, or a camera incorporated in or externally fitted to a cellular phone, personal digital assistant, personal computer, mobile computer, or peripheral device therefor.

(D1) A digital appliance comprising an image-taking lens apparatus as described in (U1) above so as to have at least one of a capability of shooting a still picture of a subject and a capability of shooting a moving picture of a subject.

(D2) A digital appliance as described in (D1) above, wherein the digital appliance is a cellular phone, personal digital assistant, personal computer, mobile computer, or peripheral device therefor.

EXAMPLES

Hereinafter, the construction and other features of practical examples of the zoom lens system used in an image-taking lens apparatus embodying the present invention will be presented with reference to their construction data and other data. Examples 1 to 3 presented below are numerical examples corresponding to the first to third embodiments, respectively, described hereinbefore, and therefore the optical construction diagrams (FIGS. 1 to 3) of the first to third embodiments also show the lens construction of Examples 1 to 3, respectively.

Tables 1 to 3 show the construction data of Examples 1 to 3, respectively. Table 4 shows the values of the conditional formulae and the data related thereto as actually observed in each example. In Tables 1 to 3, $\lambda_0$ represents the design wavelength (in nm), Y' represents the maximum image height on the light-receiving surface of the image sensor SR (corresponding to the distance from the optical axis AX, in mm), and f and Fno respectively represent the focal length (in mm) and f-number of the entire system at different focal lengths (W, M, and T). Here, W denotes the wide-angel end (the shortest-focal-length state), M denotes the middle position (the middle-focal-length state), and T denotes the telephoto end (the longest-focal-length state).

Tables 1 to 3 show, for the respective examples, the basic optical construction (with "i" representing the surface number) from the object plane OB to the image plane IM. In these tables, ri (i=0, 1, 2, 3, . . . ) represents the radius of curvature (in mm) of the i-th surface from the object side, di (i=0, 1, 2, 3, . . . ) represents the axial distance (in mm) between the i-th and (i+1)-th surfaces from the object side (with d0 representing the object distance), and Ni (i=1, 2, 3, . . . ) and vi (i=1, 2, 3, . . . ) respectively represent the refractive index for the d-line and the Abbe number of the optical material filling the axial distance di.

A surface of which the radius of curvature ri is marked with an asterisk (*) is an aspherical surface (a refractive optical surface having an aspherical shape, a surface exerting an refracting effect equivalent to that of an aspherical surface, or the like), of which the surface shape is defined by formula (AS) below. Tables 1 to 3 show the aspherical surface data of the respective examples (it should be noted that "E-n" represents "×10$^{-n}$", and that any coefficient that is not shown equals 0). An air gap of which the axial distance di is marked with a number sign (#) has a variable axial distance, i.e., an axial distance that varies as zooming is performed. Tables 1 to 3 show the variable axial distance data as actually observed in the different focal-length conditions W, M, and T in the respective examples.

$$x=(C0 \cdot y^2)/\{1+[1-(1+K)\cdot C0^2 \cdot y^2]^{1/2}\}+\Sigma(Aj \cdot y^j) \quad (AS)$$

where
    x represents the displacement along the optical axis AX at the height y (relative to the vertex);
    y represents the height in a direction perpendicular to the optical axis AX;
    C0 represents the paraxial curvature (=1/ri);
    K represents the conic coefficient; and
    Aj represents the aspherical coefficient of the j-th order.

FIGS. 6A to 6I, FIGS. 7A to 7I, and FIGS. 8A to 8I are aberration diagrams of Examples 1 to 3, respectively, as observed with the focus at infinity. Of these aberration diagrams, those with numbers suffixed with A, B, and C show the aberrations observed at the wide-angle end W, those with numbers suffixed with D, E, and F show the aberrations observed at the middle M, and those with numbers suffixed with G, H, and I show the aberrations observed at the telephoto end T. Of these aberration diagrams, those with numbers suffixed with A, D, and G show spherical aberration etc., those with numbers suffixed with B, E, and H show astigmatism, and those with numbers suffixed with C, F, and I show distortion, with FNO representing the f-number and Y' representing the maximum image height (mm). In the spherical aberration diagrams, the solid line (d), dash-and-dot line (g), and dash-dot-dot line (c) represent the spherical aberration (mm) observed for the d-line (with a wavelength of $\lambda_0$), g-line, and c-line, respectively, and the broken line (SC) represents the deviation (mm) from the sine condition to be fulfilled. In the astigmatism diagrams, the broken line (DM) and solid line (DS) represent the astigmatism (mm) observed for the d-line on the meridional and sagittal planes, respectively. In the distortion diagrams, the solid line represents the distortion (%) observed for the d-line.

TABLE 1

| | Example 1 | | Focal Length Condition | W | M | T |
|---|---|---|---|---|---|---|
| $\lambda_0$[nm] | | 587.56 | f [mm] | 2.1617 | 3.9337 | 6.269 |
| Y' [mm] | | 1.3 | Fno | 2.5612 | 4.0482 | 5.6 |

| i | ri[mm] | | di[mm] | Ni | νi | Group etc. |
|---|---|---|---|---|---|---|
| 0 | ∞ | | ∞ | # | | OB |
| 1 | −4.64187 | * | 5.169129 | 1.5251 | 56.3412 | PR |
| 2 | ∞ | | 5.300694 | # | | GR1(−) |
| 3 | ∞ | | 0 | | | ST |
| 4 | 4.47779 | * | 0.840968 | 1.78831 | 47.3175 | GR2(+) |
| 5 | −8.04192 | * | 0.860871 | | | |
| 6 | 16.16451 | | 0.803065 | 1.78831 | 47.3175 | |
| 7 | −6.60765 | | 0.108128 | | | |
| 8 | −25.58769 | | 0.8 | 1.7985 | 22.6012 | |
| 9 | 1.84639 | | 0.5 | # | | |
| 10 | 4.40972 | * | 1.041193 | 1.5251 | 56.3412 | GR3(+) |
| 11 | −2.07966 | * | 0.696848 | # | | |
| 12 | ∞ | | 0.3 | 1.5168 | 64.1988 | CG |
| 13 | ∞ | | 0.5 | | | |
| 14 | ∞ | | | | | IM(SR) |

| Aspherical Surface Data of the i-th Surface (*) | | | | | | |
|---|---|---|---|---|---|---|
| i | K | A4 | A6 | A8 | A10 | A12 |
| 1 | 0 | 2.787E−03 | 1.742E−04 | −2.660E−05 | 1.333E−06 | 0.000E+00 |
| 4 | 0 | −1.113E−02 | 3.022E−03 | −3.976E−03 | 0.000E+00 | 0.000E+00 |
| 5 | 0 | −4.733E−03 | 6.366E−04 | −2.595E−03 | 0.000E+00 | 0.000E+00 |
| 10 | 0 | 2.244E−02 | −1.338E−02 | 1.181E−03 | 3.759E−04 | 0.000E+00 |
| 11 | 0 | 9.392E−02 | −3.677E−02 | 7.253E−02 | −1.428E−05 | 0.000E+00 |

| Variable Distance Data di (#) | | | |
|---|---|---|---|
| i | W | M | T |
| 0 | ∞ | ∞ | ∞ |
| 2 | 5.301 | 3.003 | 0.925 |
| 9 | 0.500 | 3.245 | 5.447 |
| 11 | 0.697 | 0.249 | 0.125 |

TABLE 2

| | Example 2 | | Focal Length Condition | W | M | T |
|---|---|---|---|---|---|---|
| $\lambda_0$[nm] | | 587.56 | f [mm] | 5.4 | 8.1 | 10.7971 |
| Y' [mm] | | 3.33 | Fno | 3.5761 | 4.4878 | 5.4 |

| i | ri[mm] | | di[mm] | Ni | νi | Group etc. |
|---|---|---|---|---|---|---|
| 0 | ∞ | | ∞ | # | | OB |
| 1 | −31.31248 | * | 1.2 | 1.522 | 52.2 | GR1(−) |
| 2 | 3.53427 | * | 0.803794 | | | |
| 3 | 4.16646 | | 2.25 | 1.673556 | 42.0154 | |
| 4 | 6.49172 | | 4.367259 | # | | |
| 5 | ∞ | | 0 | | | ST |
| 6 | 2.83472 | * | 1.165816 | 1.7545 | 51.57 | GR2(+) |
| 7 | −24.54237 | * | 0.255414 | | | |
| 8 | 8.36104 | | 1.011903 | 1.7985 | 22.6 | |
| 9 | 2.29463 | * | 3.359898 | # | | |
| 10 | 9.01923 | * | 2.196929 | 1.522 | 53.2257 | GR3(+) |
| 11 | −7.26754 | * | 0.5 | | | |
| 12 | ∞ | | 0.3 | 1.5168 | 64.1988 | CG |
| 13 | ∞ | | 0.5 | | | |
| 14 | ∞ | | | | | IM(SR) |

| Aspherical Surface Data of the i-th Surface(*) | | | | | | |
|---|---|---|---|---|---|---|
| i | K | A4 | A6 | A8 | A10 | A12 |
| 1 | 0 | 1.427E−04 | −4.466E−05 | 1.683E−06 | 1.154E−08 | 0.000E+00 |
| 2 | 0 | −7.596E−04 | 4.745E−05 | −2.579E−05 | 1.211E−06 | 0.000E+00 |
| 6 | 0 | 2.055E−03 | 1.513E−03 | 9.953E−05 | 1.769E−04 | 0.000E+00 |

TABLE 2-continued

| | | | | | | |
|---|---|---|---|---|---|---|
| 7 | 0 | 1.394E-02 | 3.025E-03 | -6.797E-04 | 9.094E-04 | 0.000E+00 |
| 9 | 0 | -4.976E-03 | 1.757E-03 | -3.632E-05 | -3.032E-04 | 0.000E+00 |
| 10 | 0 | -5.036E-04 | -4.641E-04 | 3.704E-05 | -4.573E-07 | 0.000E+00 |
| 11 | 0 | 1.945E-03 | -7.205E-04 | 4.021E-05 | 0.000E+00 | 0.000E+00 |

Variable Distance Data di (#)

| i | W | M | T |
|---|---|---|---|
| 0 | ∞ | ∞ | ∞ |
| 4 | 14.255 | 4.458 | 0.800 |
| 9 | 0.500 | 10.297 | 13.955 |

TABLE 3

| Example 3 | | Focal Length Condition | W | M | T |
|---|---|---|---|---|---|
| $\lambda_0$[nm] | 587.56 | f [mm] | 4.7997 | 8.1596 | 13.9193 |
| Y' [mm] | 3 | Fno | 2.544 | 3.6166 | 5.2 |

| i | ri[mm] | | di[mm] | | Ni | vi | Group etc. |
|---|---|---|---|---|---|---|---|
| 0 | ∞ | | ∞ | # | | | OB |
| 1 | -16.19959 | * | 11.5 | | 1.53048 | 56.7018 | PR |
| 2 | ∞ | | 2 | | | | |
| 3 | -6.94605 | | 0.6 | | 1.77283 | 48.6148 | GR1(-) |
| 4 | -79.47022 | | 0.01 | | 1.514 | 42.8333 | |
| 5 | -79.47022 | | 4.932696 | | 1.816126 | 25.4634 | |
| 6 | -14.0335 | | 14.389707 | # | | | |
| 7 | ∞ | | 0 | | | | ST |
| 8 | 5.72466 | * | 3.940024 | | 1.592115 | 60.9284 | GR2(+) |
| 9 | 50.7932 | | 0.01 | | 1.514 | 42.8333 | |
| 10 | 50.79329 | | 0.6 | | 1.737847 | 27.9073 | |
| 11 | 5.60823 | | 0.75164 | | | | |
| 12 | 13.6623 | | 1.412774 | | 1.7522 | 51.6472 | |
| 13 | -26.26359 | | 0.741325 | # | | | |
| 14 | -8.38476 | | 0.8 | | 1.64952 | 41.9333 | GR3(+) |
| 15 | -18.00652 | | 0.1 | | | | |
| 16 | 11.98366 | * | 2.5 | | 1.522664 | 65.8574 | |
| 17 | -13.74814 | * | 8.55476 | # | | | |
| 18 | ∞ | | 0.3 | | 1.48749 | 70.44 | CG |
| 19 | ∞ | | 0.5 | | | | |
| 20 | ∞ | | | | | | IM(SR) |

Aspherical Surface Data of the i-th Surface(*)

| i | K | A4 | A6 | A8 | A10 | A12 |
|---|---|---|---|---|---|---|
| 1 | -5.775628 | 1.078E-04 | 8.526E-07 | -1.555E-08 | 8.623E-11 | 0.000E+00 |
| 8 | 0.892077 | -9.209E-04 | -3.718E-05 | -2.418E-08 | -1.703E-07 | 0.000E+00 |
| 16 | 0 | 9.130E-04 | 1.674E-05 | 3.462E-06 | -2.609E-08 | 0.000E+00 |
| 17 | 0 | 1.163E-03 | 4.338E-05 | 4.831E-07 | 3.000E-07 | 0.000E+00 |

Variable Distance Data di (#)

| i | W | M | T |
|---|---|---|---|
| 0 | ∞ | ∞ | ∞ |
| 6 | 14.390 | 7.741 | 2.400 |
| 13 | 0.741 | 11.037 | 20.534 |
| 17 | 8.555 | 4.908 | 0.752 |

TABLE 4

| Conditional Formula Values | | Example 1 | Example 2 | Example 3 |
|---|---|---|---|---|
| (1), (1a) | Bf/Y' | 0.712 | 0.390 | 0.517 |
| (2), (2a) | Bf/fw | 0.428 | 0.241 | 0.323 |
| (3), (3a) | Bf/Lw | 0.055 | 0.072 | 0.029 |
| (4), (4a) | Bf/D | 7.383 | 2.600 | 2.064 |
| (5), (5a) | P1/Pw | -0.245 | -0.525 | -0.342 |
| (6), (6a) | P1/Pt | -0.709 | -1.050 | -0.991 |
| (7), (7a) | P3/Pw | 0.759 | 0.668 | 0.214 |
| (8), (8a) | P3/Pt | 2.201 | 1.336 | 0.621 |
| (9), (9a) | P23/Pw | 0.546 | 0.814 | 0.423 |
| (10), (10a) | (R1 + R2)/(R1 - R2) | 0.359 | 0.108 | -0.069 |

TABLE 4-continued

| Related Values | Example 1 | Example 2 | Example 3 |
|---|---|---|---|
| Bf | 0.925 | 1.300 | 1.552 |
| Y' | 1.300 | 3.330 | 3.000 |
| fw | 2.162 | 5.400 | 4.800 |
| Lw | 16.921 | 18.000 | 53.143 |
| D | 0.125 | 0.500 | 0.752 |
| P1 | −0.113 | −0.097 | −0.071 |
| P3 | 0.351 | 0.124 | 0.045 |
| Pw | 0.463 | 0.185 | 0.208 |
| Pt | 0.160 | 0.093 | 0.072 |
| P23 | 0.2527004 | 0.1507544 | 0.088049 |
| R1 | 4.40972 | 9.01923 | 11.98366 |
| R2 | −2.07966 | −7.26754 | −13.74814 |

What is claimed is:

1. A zoom lens system for forming an optical image of a subject on a light-receiving surface of an image sensor that converts the optical image into an electrical signal,
the zoom lens system comprising, from an object side thereof, at least a first lens unit, a second lens unit, and a third lens unit,
the zoom lens system achieving zooming by varying distances between the lens units,
the first lens unit having a negative optical power,
the second lens unit having a positive optical power,
wherein the zoom lens system fulfills the following condition:

$$0.1 < Bf/Y' < 1.0$$

where
Bf represents an axial distance from a last lens surface to an image plane (in a case where a last lens element is movable during zooming, a minimum axial distance from the last lens surface to the image plane throughout a zoom range); and
Y' represents half a diagonal length of an image-sensing area.

2. A zoom lens system as claimed in claim 1, wherein the zoom lens system fulfills the following condition:

$$0.2 < P23/Pw < 1.0$$

where
P23 represents a composite optical power of the second and third lens units; and
Pw represents an optical power of the zoom lens system as a whole at a wide-angle end.

3. A zoom lens system as claimed in claim 1, wherein the zoom lens system fulfills the following condition:

$$-0.8 < P1/Pw < -0.1$$

where
P1 represents an optical power of the first lens unit; and
Pw represents an optical power of the zoom lens system as a whole at a wide-angle end.

4. A zoom lens system as claimed in claim 1, wherein the zoom lens system fulfills the following condition:

$$0.15 < P3/Pw < 0.85$$

where
P3 represents an optical power of the third lens unit; and
Pw represents an optical power of the zoom lens system as a whole at a wide-angle end.

5. A zoom lens system as claimed in claim 1, wherein the zoom lens system fulfills the following condition:

$$-0.15 < (R1+R2)/(R1-R2) < 0.5$$

where
R1 represents a radius of curvature of an object-side surface of a lens element disposed at a most image-side end of a last lens unit; and
R2 represents a radius of curvature of an image-side surface of the lens element disposed at the most image-side end of the last lens unit.

6. A zoom lens system as claimed in claim 1, wherein the second lens unit includes an aperture stop.

7. A zoom lens system for forming an optical image of a subject on a light-receiving surface of an image sensor that converts the optical image into an electrical signal,
the zoom lens system comprising, from an object side thereof, at least a first lens unit, a second lens unit, and a third lens unit,
the zoom lens system achieving zooming by varying distances between the lens units,
the first lens unit having a negative optical power,
the second lens unit having a positive optical power,
wherein the zoom lens system fulfills the following condition:

$$0.1 < Bf/fw < 0.8$$

where
Bf represents an axial distance from a last lens surface to an image plane (in a case where a last lens element is movable during zooming, a minimum axial distance from the last lens surface to the image plane throughout a zoom range); and
fw represents a focal length of the zoom lens system as a whole at a wide-angle end.

8. A zoom lens system as claimed in claim 7, wherein the zoom lens system fulfills the following condition:

$$0.2 < P23/Pw < 1.0$$

where
P23 represents a composite optical power of the second and third lens units; and
Pw represents an optical power of the zoom lens system as a whole at a wide-angle end.

9. A zoom lens system as claimed in claim 7, wherein the zoom lens system fulfills the following condition:

$$-0.8 < P1/Pw < -0.1$$

where
P1 represents an optical power of the first lens unit; and
Pw represents an optical power of the zoom lens system as a whole at a wide-angle end.

10. A zoom lens system as claimed in claim 7, wherein the zoom lens system fulfills the following condition:

$$0.15 < P3/Pw < 0.85$$

where
P3 represents an optical power of the third lens unit; and
Pw represents an optical power of the zoom lens system as a whole at a wide-angle end.

11. A zoom lens system as claimed in claim 7,
wherein the zoom lens system fulfills the following condition:

$$-0.15<(R1+R2)/(R1R2)<0.5$$

where
R1 represents a radius of curvature of an object-side surface of a lens element disposed at a most image-side end of a last lens unit; and
R2 represents a radius of curvature of an image-side surface of the lens element disposed at the most image-side end of the last lens unit.

12. A zoom lens system as claimed in claim 7,
wherein the second lens unit includes an aperture stop.

13. A zoom lens system for forming an optical image of a subject on a light-receiving surface of an image sensor that converts the optical image into an electrical signal,
the zoom lens system comprising three lens units, namely, from an object side thereof, a first lens unit having a negative optical power, a second lens unit having a positive optical power, and a third lens unit having a positive optical power,
the zoom lens system achieving zooming by varying distances between the lens units,
wherein the zoom lens system fulfills the following condition:

$$0.2<P23/Pw<1.0$$

where
P23 represents a composite optical power of the second and third lens units; and
Pw represents an optical power of the zoom lens system as a whole at a wide-angle end.

14. A zoom lens system as claimed in claim 13,
wherein the zoom lens system fulfills the following condition:

$$-0.8<P1/Pw<-0.1$$

where
P1 represents an optical power of the first lens unit; and
Pw represents an optical power of the zoom lens system as a whole at a wide-angle end.

15. A zoom lens system as claimed in claim 13,
wherein the zoom lens system fulfills the following condition:

$$0.15<P3/Pw<0.85$$

where
P3 represents an optical power of the third lens unit; and
Pw represents an optical power of the zoom lens system as a whole at a wide-angle end.

16. A zoom lens system as claimed in claim 13,
wherein the zoom lens system fulfills the following condition:

$$0.15<(R1+R2)/(R1R2)<0.5$$

where
R1 represents a radius of curvature of an object-side surface of a lens element disposed at a most image-side end of a last lens unit; and
R2 represents a radius of curvature of an image-side surface of the lens element disposed at the most image-side end of the last lens unit.

17. A zoom lens system as claimed in claim 13,
wherein the second lens unit includes an aperture stop.

18. A zoom lens system, for forming an optical image of a subject on a light-receiving surface of an image sensor that converts the optical image into an electrical signal,
the zoom lens system comprising, from an object side thereof, at least a first lens unit, a second lens unit, and a third lens unit,
the zoom lens system achieving zooming by varying distances between the lens units,
the first lens unit having a negative optical power,
the second lens unit having a positive optical power,
wherein the zoom lens system fulfills the following conditions:

$$0.01<Bf/Lw<0.2$$

and $$-0.8<P1/Pw<-0.1$$

where
Bf represents an axial distance from a last lens surface to an image plane (in a case where a last lens element is movable during zooming, a minimum axial distance from the last lens surface to the image plane throughout a zoom range);
Lw represents a length from a most object-side surface of the zoom lens system to the image plane at a wide-angle end;
P1 represents an optical power of the first lens unit; and
Pw represents an optical power of the zoom lens system as a whole at a wide-angle end.

19. An image-taking apparatus comprising:
a zoom lens system as claimed in one of claims 1, 7, and 13; and the image sensor.

* * * * *

UNITED STATES PATENT AND TRADEMARK OFFICE
CERTIFICATE OF CORRECTION

| | | |
|---|---|---|
| PATENT NO. | : 7,050,241 B2 | Page 1 of 1 |
| APPLICATION NO. | : 10/799110 | |
| DATED | : May 23, 2006 | |
| INVENTOR(S) | : Kaori Kojima and Kazuhiko Ishimaru | |

It is certified that error appears in the above-identified patent and that said Letters Patent is hereby corrected as shown below:

Column 23:
Line 4, delete "-0.15 < (R1 + R2) / (R1R2) < 0.5" and insert
-- -0.15 < (R1 + R2) / (R1 − R2) < 0.5 --.

Column 24:
Line 4, delete "0.15 < (R1 + R2) / (R1R2) < 0.5" and insert
-- -0.15 < (R1 + R2) / (R1 − R2) < 0.5 --.

Signed and Sealed this

Twenty-second Day of August, 2006

JON W. DUDAS
*Director of the United States Patent and Trademark Office*